(12) United States Patent
Koyama et al.

(10) Patent No.: US 11,092,168 B2
(45) Date of Patent: Aug. 17, 2021

(54) FASTENER AND ELECTRONIC APPARATUS

(71) Applicant: Kabushiki Kaisha Toshiba, Minato-ku (JP)

(72) Inventors: Tsubasa Koyama, Hachioji (JP); Masaya Hirashima, Yokohama (JP); Naonori Watanabe, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 7 days.

(21) Appl. No.: 16/447,420

(22) Filed: Jun. 20, 2019

(65) Prior Publication Data

US 2019/0390689 A1 Dec. 26, 2019

(30) Foreign Application Priority Data

Jun. 21, 2018 (JP) .............................. JP2018-118042

(51) Int. Cl.
| | |
|---|---|
| *F04D 29/62* | (2006.01) |
| *G06F 1/20* | (2006.01) |
| *F04D 29/26* | (2006.01) |
| *F04D 17/16* | (2006.01) |

(52) U.S. Cl.
CPC .......... *F04D 29/626* (2013.01); *F04D 29/263* (2013.01); *G06F 1/203* (2013.01); *F04D 17/16* (2013.01)

(58) Field of Classification Search
CPC ...... F04D 29/626; F04D 29/263; F04D 17/16; F04D 25/0613; F04D 25/064; F04D 29/281; G06F 1/203; F16B 1/00; F16B 21/18; F16B 21/183; F16B 21/186; F05D 2260/38; Y10T 24/44026

See application file for complete search history.

(56) References Cited

U.S. PATENT DOCUMENTS

| | | | | |
|---|---|---|---|---|
| 2,135,418 A | * | 11/1938 | Tinnerman | .............. F16B 37/02 72/335 |
| 2,823,058 A | * | 2/1958 | Ecker | ........................ F16J 15/38 277/589 |
| 4,892,432 A | * | 1/1990 | Cooper | ..................... F16B 3/00 192/53.35 |
| 5,564,838 A | * | 10/1996 | Caillault | ............... F16B 21/183 384/448 |
| 7,532,470 B2 | | 5/2009 | Ariga | |
| 2010/0085759 A1 | | 4/2010 | O'Sullivan et al. | |
| 2012/0114512 A1 | * | 5/2012 | Lofy | ...................... F04D 17/08 417/410.1 |

FOREIGN PATENT DOCUMENTS

| | | |
|---|---|---|
| JP | 2007-149007 | 6/2007 |
| JP | 2008-198478 | 8/2008 |
| TW | I537482 B | 6/2016 |

* cited by examiner

*Primary Examiner* — Woody A Lee, Jr.
*Assistant Examiner* — Jesse M Prager
(74) *Attorney, Agent, or Firm* — Oblon, McClelland, Maier & Neustadt, L.L.P.

(57) ABSTRACT

According to one embodiment, a fastener installed between a blower fan and a rotating mechanism includes a fastener main body, a first flange portion, a second flange portion, and a slit portion. The fastener main body has a cylindrical outline which is partly cut. The slit portion is continuously cut from the first flange portion to the second flange portion via the fastener main body.

3 Claims, 4 Drawing Sheets

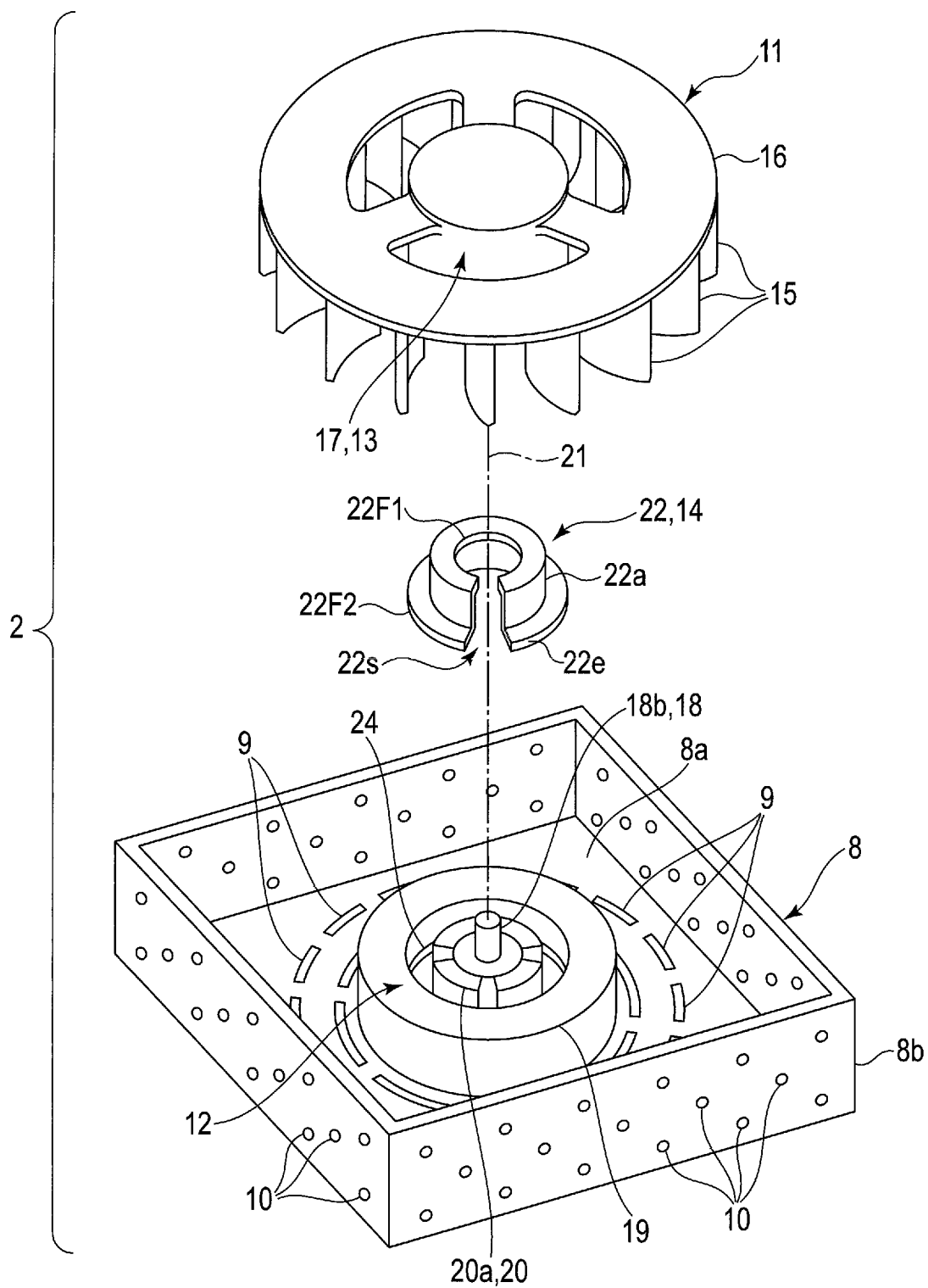
F I G. 2

FASTENER AND ELECTRONIC APPARATUS

CROSS-REFERENCE TO RELATED APPLICATIONS

This application is based upon and claims the benefit of priority from Japanese Patent Application No. 2018-118042, filed Jun. 21, 2018, the entire contents of which are incorporated herein by reference.

FIELD

Embodiments described herein relate generally to a technique of preventing at least one of detachment and tilt of a rotating blower fan when an electronic apparatus radiates heat.

BACKGROUND

For example, various types of electronic apparatus, such as notebook portable computers, are provided with blower fans in cases accommodating electrical components. In this case, when the electronic apparatuses radiate heat, the insides of the cases accommodating the electrical components are ventilated by rotating the blower fans.

Incidentally, in recent years, as the electronic apparatuses become thinner and smaller, the blower fans have been disposed in the vicinity of peripheral structures in the cases. Thus, if the blower fans detach or tilt under the influence of, for example, wind pressure or centrifugal force, when the blower fans are rotating, the blower fans may contact or be caught in the peripheral structures depending on the degree of detachment or tilt. In this case, the blower fans may become unable to smoothly and lightly rotate, and moreover, the blower fans may become unable to rotate.

BRIEF DESCRIPTION OF THE DRAWINGS

FIG. 2 is an exploded perspective view of the ventilator including a fastener.

DETAILED DESCRIPTION

Embodiments described herein aim to provide the technique of preventing at least one of detachment and tilt of a blower fan.

In general, according to one embodiment, a fastener installed between a blower fan and a rotating mechanism comprises a fastener main body, a first flange portion, a second flange portion, and a slit portion. The fastener main body has a cylindrical outline which is partly cut. The slit portion is continuously cut from the first flange portion to the second flange portion via the fastener main body.

One Embodiment

Figure 1:
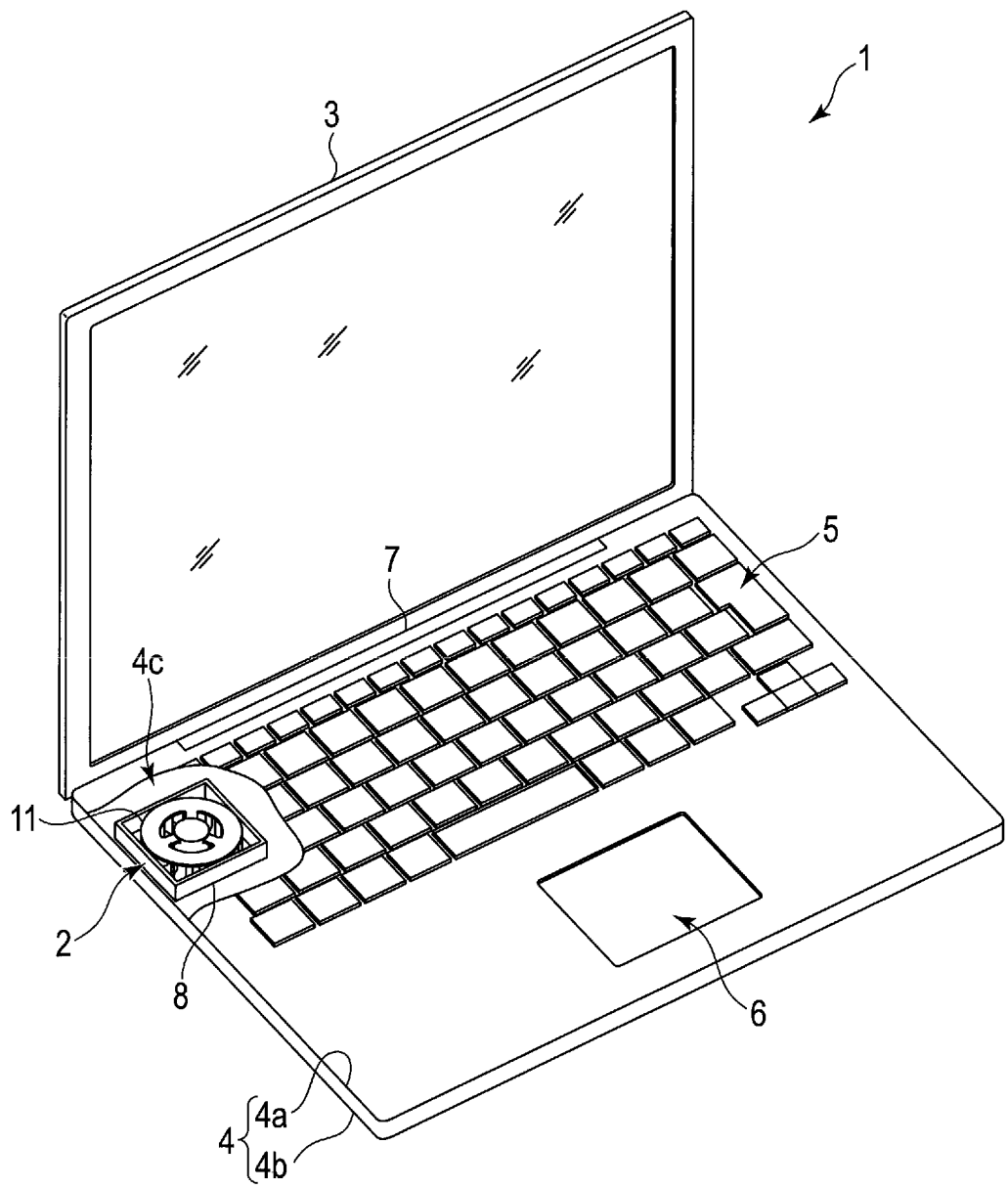
FIG. 1 is a perspective view of an electronic apparatus comprising a ventilator according to one embodiment.

FIG. 1 is a perspective view of a notebook portable computer comprising a ventilator 2 as an example of an electronic apparatus 1 according to a present embodiment.

As shown in FIG. 1, the electronic apparatus 1 comprises a monitor 3, an apparatus main body 4, a keyboard 5, and an operation pad 6.

The monitor 3 is connected to the apparatus main body 4 via a hinge 7 to be openable and closeable. The apparatus main body 4 comprises an upper case 4a and a lower case 4b. The keyboard 5 and the operation pad 6 are disposed on the upper case 4a. Here, at power-on, when the keyboard 5 or the operation pad 6 is operated by a finger, a result of the operation is displayed by the monitor 3.

In the apparatus main body 4, an internal space 4c for accommodating electrical components (not shown in the figures), for example, a communication module, various boards, and a memory, is formed. The internal space 4c is formed between the cases 4a and 4b and isolated from the outside in a state in which the upper case 4a and the lower case 4b are laid on each other. Thus, the internal space 4c of the apparatus main body 4 is easily filled with heat produced by the electrical components. Therefore, the ventilator 2, which ventilates the internal space 4c, is disposed inside the apparatus main body 4.

Figure 3:
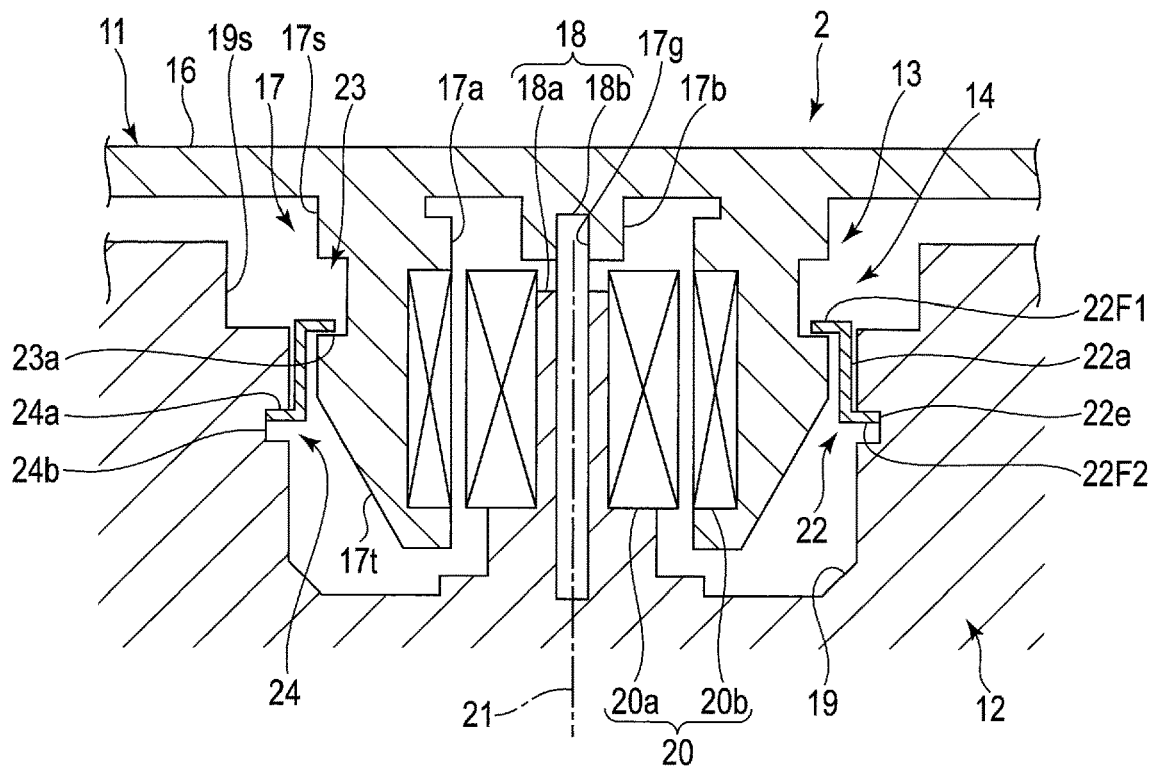
FIG. 3 is a sectional view of the ventilator around the fastener.

FIG. 2 is an exploded perspective view showing the structure of the ventilator 2, and FIG. 3 is a sectional view of the ventilator 2 around a fastener 22, which will be described later. As shown in FIG. 2 and FIG. 3, the ventilator 2 is disposed in the internal space 4c (for example, the lower case 4b) of the apparatus main body 4 in the state of being accommodated in an accommodation housing 8. The accommodation housing 8 comprises a bottom wall 8a and a sidewall 8b standing from the periphery of the bottom wall 8a. The bottom wall 8a is provided with a plurality of exhaust vents 9. Each of the exhaust vents 9 is formed to penetrate the apparatus main body 4 (the lower case 4b) from the bottom wall 8a. Moreover, the sidewall 8b is provided with a plurality of air vents 10, and each of the air vents 10 is formed to penetrate the sidewall 8b.

The ventilator 2 is mounted on the bottom wall 8a of the accommodation housing 8. The accommodation housing 8 is disposed in the internal space 4c of the apparatus main body 4 such that the bottom wall 8a is placed on the lower case 4b of the apparatus main body 4. In FIG. 2, the accommodation housing 8 has a rectangular solid shape as an example, but may have other shapes (for example, an elliptic or a polygonal solid shape).

The ventilator 2 comprises a blower fan 11, a rotating mechanism 12, a connecting mechanism 13, and a detachment/tilt prevention mechanism 14. The blower fan 11 and the rotating mechanism 12 are connected to each other by the connecting mechanism 13. The rotational movement of the rotating mechanism 12 is transmitted to the blower fan 11 via the connecting mechanism 13, and the blower fan 11 is rotated. In addition, the detachment/tilt prevention mechanism 14 is disposed between the blower fan 11 and the rotating mechanism 12. When the blower fan 11 rotates, the detachment/tilt prevention mechanism 14 prevents at least one of detachment and tilt of the blower fan 11. A more specific description follows.

The blower fan 11 comprises a plurality of rotary wings 15, a support frame 16, and a socket 17. The support frame 16 has the shape of a disk. The rotary wings 15 are disposed at regular intervals along the direction of rotation of the blower fan 11 (specifically, the periphery of the support frame 16). The socket 17 is disposed in the center of the support frame 16, and configured to be connectable to a rotation axis portion 18 (the rotating mechanism 12), which will be described later. The details of the socket 17 will be described later. Further, in a state in which the blower fan 11 and the rotating mechanism 12 are connected to each other by the connecting mechanism 13, the rotary wings 15 are disposed to face the exhaust vents 9 and the air vents 10 described above.

Next, the rotating mechanism 12 comprises the rotation axis portion 18, a rotational base 19, and an actuator 20. The rotation axis portion 18 extends toward the blower fan 11 (the socket 17). The rotational base 19 is configured to surround the rotation axis portion 18 and to be unable to rotate. In FIG. 3, the rotation axis portion 18 and the rotational base 19 are integrally formed as an example. As the actuator 20, a motor comprising a stator 20a including an electromagnetic coil and a rotor 20b including a permanent magnet is applied. The stator 20a is disposed in the rotation axis portion 18, and the rotor 20b is disposed in the socket 17. The details of the rotation axis portion 18 will be described later.

Moreover, the connecting mechanism 13 is constituted of the socket 17 of the blower fan 11 and the rotation axis portion 18 of the rotating mechanism 12. In a state in which the blower fan 11 and the rotating mechanism 12 are connected by the connecting mechanism 13, the socket 17 is positioned to face the outer periphery of the rotation axis portion 18. At this time, the socket 17 and the rotation axis portion 18 are disposed to overlap each other around a rotation axis 21.

The socket 17 comprises a socket main body 17a and a connecting portion 17b. The connecting portion 17b is disposed along the center (the rotation axis 21) of the support frame 16, and formed such that the rotation axis portion 18 (specifically, the distal end of a shaft 18b) can be fit thereinto. The socket main body 17a is continuously or intermittently formed to surround the connecting portion 17b. The proximal end of the socket main body 17a is fixed to the support frame 16, and the distal end thereof extends along the rotation axis portion 18. In FIG. 3, the socket 17 (the socket main body 17a and the connecting portion 17b) is formed integrally with the support frame 16 as an example. The above-described rotor 20b is disposed on the inner surface of the socket main body 17a.

Also, an inclined surface 17t having a preset inclination is formed on the outer surface (opposite to the inner surface) of the socket main body 17a (the socket 17). The inclined surface 17t has the shape of a cone which tapers from the proximal end toward the distal end of the socket main body 17a. The inclined surface 17t functions as a guide surface for fitting the socket 17 (the socket main body 17a) into the fastener 22, when the fastener 22 (the detachment/tilt prevention mechanism 14), which will be described later, is installed between the blower fan 11 and the rotating mechanism 12.

On the other hand, the rotation axis portion 18 comprises an axis portion main body 18a and the shaft 18b. The axis portion main body 18a extends from the rotational base 19 toward the blower fan 11 (specifically, the socket 17). The shaft 18b is a metallic cylindrical member extending straight. The shaft 18b is embedded in and supported by the axis portion main body 18a, and its distal end projects from the axis portion main body 18a toward the blower fan 11 (the socket 17). The above-described stator 20a is disposed on the outer surface of the axis portion main body 18a.

In the above-described structure, the axis portion main body 18a of the rotation axis portion 18 (the rotating mechanism 12) is fitted into the socket 17 of the blower fan 11. At this time, the socket 17 is disposed to face and overlap the periphery of the rotation axis portion 18. The rotational base 19 is disposed to surround the socket 17 and the rotation axis portion 18, which are disposed to overlap each other around the rotation axis 21. That is, the rotational base 19 is disposed to face the periphery of the socket 17.

FIG. 3 shows a fitting method of fitting the rotation axis portion 18 into the socket 17 as an example. According to the fitting method of FIG. 3, the distal end portion of the shaft 18b of the rotation axis portion 18 is, for example, twisted, fitted, or pressed into the connecting portion 17b (that is, a fitting recess 17g) of the blower fan 11. The blower fan 11 and the rotating mechanism 12 are thereby connected to each other by the connecting mechanism 13. In this state, the rotor 20b is disposed to face the outside of the stator 20a.

The fitting recess 17g is formed by recessing a part of the connecting portion 17b into a cylindrical shape. In this case, the inner shape (that is, the inside diameter) of the fitting recess 17g is preferably set slightly smaller than the outer shape (that is, the outside diameter) of the distal end portion of the cylindrical shaft 18b. The distal end portion of the shaft 18b thereby can be firmly fitted into the connecting portion 17b (the fitting recess 17g) without shaking.

Here, a current is applied to the stator 20a (electromagnetic coil). Magnetic action occurs between the stator 20a (electromagnetic coil) and the rotor 20b (permanent magnet). Then, the rotor 20b rotates around the stator 20a. The rotational movement of the rotor 20b is transmitted to the support frame 16 via the socket 17 of the blower fan 11, and the support frame 16 is rotated. With the rotation of the support frame 16, the rotary wings 15 revolve. The air in the internal space 4c of the apparatus main body 4 is thereby forcibly made to flow, and forced convection of air occurs along the internal space 4c.

At this time, the air absorbed from an intake vent (not shown in the figures) of the apparatus main body 4 flows through the internal space 4c of the apparatus main body 4, and then passes through the air vents 10 of the accommodation housing 8 and is emitted to the outside from the exhaust vents 9. With the air, heat produced from the electronic components is also emitted. The internal space 4c of the apparatus main body 4 is thereby continuously ventilated. As a result, heat radiation of the electronic apparatus is promoted.

"Detachment/Tilt Prevention Mechanism 14"

As shown in FIG. 2 and FIG. 3, the electronic apparatus of the present embodiment is provided with the detachment/tilt prevention mechanism 14 in order to prevent at least one of detachment and tilt of the rotating blower fan 11, for example, at the time of the above-described heat radiation (ventilation). The detachment/tilt prevention mechanism 14 comprises the fastener 22, a first engagement portion 23, and a second engagement portion 24.

The fastener 22 is installed between the blower fan 11 and the rotating mechanism 12. To be specific, the fastener 22 is installed in the range in which the socket 17 (the blower fan 11) and the rotation axis portion 18 (the rotating mechanism 12) overlap each other around the rotation axis 21. In this case, as will be described later, one end of the fastener 22 engages with the first engagement portion 23 of the blower fan 11, and the other end (opposite to the one end) of the fastener 22 engages with the second engagement portion 24 of the rotating mechanism 12.

Incidentally, in a state in which the blower fan 11 and the rotating mechanism 12 are connected to each other, the rotational base 19 is disposed to face the periphery of the socket 17. At this time, a facing surface 19s facing the socket 17 is formed on the rotational base 19, and a facing surface 17s facing the rotational base 19 is formed on the socket 17. In addition, the fastener 22 is interposed between both the facing surfaces 17s and 19s. In this case, the first engagement portion 23 is disposed on the facing surface 17s of the socket 17 (the blower fan 11), and the second engagement portion 24 is disposed on the facing surface 19s of the rotational base 19 (the rotating mechanism 12).

The fastener 22 is preferably formed of a resin material, for example, polyacetal. Such a resin material enables the fastener 22 to have a low coefficient of friction with metal and to be excellent in elasticity.

The fastener 22 comprises a fastener main body 22a, a first flange portion 22F1, a second flange portion 22F2, and a slit portion 22s. The fastener main body 22a has a cylindrical outline which is partly cut. The first flange portion 22F1 is disposed at one end of the fastener main body 22a (the fastener 22). The second flange portion 22F2 is disposed at the other end of the fastener main body 22a (the fastener 22). The slit portion 22s is continuously cut from the first flange portion 22F1 to the second flange portion 22F2 via the fastener main body 22a.

In FIG. 2 and FIG. 3, the first flange portion 22F1 (one end of the fastener) projects inward, and the second flange portion 22F2 (the other end of the fastener) projects outward (in a direction opposite to an inward direction). Also, the amount (length) by which each of the flange portions 22F1 and 22F2 projects and the shape and the size (extent) of the above-described slit portion 22s are set, for example, according to the sizes and the shapes of the first engagement portion 23 and the second engagement portion 24, which will be described later, and thus are not particularly limited herein.

In addition, the first engagement portion 23 disposed on the facing surface 17s of the socket 17 is formed such that the first flange portion 22F1 can partly engage therewith. The first engagement portion 23 is formed by recessing a part of the outer surface (that is, the facing surface 17s) of the socket 17 (the socket main body 17a) into a rectangular shape along a circumferential direction. The first engagement portion 23 is provided with a first engagement surface 23a, which the first flange portion 22F1 can partly contact.

The first engagement surface 23a is disposed on the far side of the first flange portion 22F1 in a direction from the proximal end to the distal end of the socket main body 17a, in other words, on the back surface side (inside) of the first flange portion 22F1. The first engagement surface 23a is disposed to partly face the first flange portion 22F1. In FIG. 3, the first flange portion 22F1 is always kept in the state of not contacting the first engagement surface 23a (the first engagement portion 23) (that is, a noncontact state) as an example.

Moreover, the second engagement portion 24 disposed on the facing surface 19s of the rotational base 19 is formed such that the second flange portion 22F2 can partly engage therewith. The second engagement portion 24 is formed by recessing a part of the inner surface (that is, the facing surface 19s) of the rotational base 19 into a rectangular shape along a circumferential direction. The second engagement portion 24 is provided with a second engagement surface 24a and a third engagement surface 24b, which the second flange portion 22F2 can partly contact.

The second engagement surface 24a is disposed on the near side of the second flange portion 22F2 in the direction from the proximal end to the distal end of the socket main body 17a, in other words, the front surface side (outside) of the second flange portion 22F2. The second engagement surface 24a is disposed to partly face the second flange portion 22F2. In FIG. 3, the second flange portion 22F2 is kept in the state of contacting the second engagement surface 24a (the second engagement portion 24) (that is, a contact state) as an example.

The third engagement surface 24b is disposed at a position which an outermost end portion (in other words, an outermost end 22e) of the other end (the second flange portion 22F2) of the fastener 22 can contact. In this case, in a state in which the fastener 22 is installed between the blower fan 11 and the rotating mechanism 12, the outermost end 22e of the fastener 22 is disposed to face the third engagement surface 24b. In FIG. 3, the outermost end 22e of the second flange portion 22F2 is kept in the state of contacting the third engagement surface 24b (the second engagement portion 24) (that is, a contact state) as an example.

Figure 4:
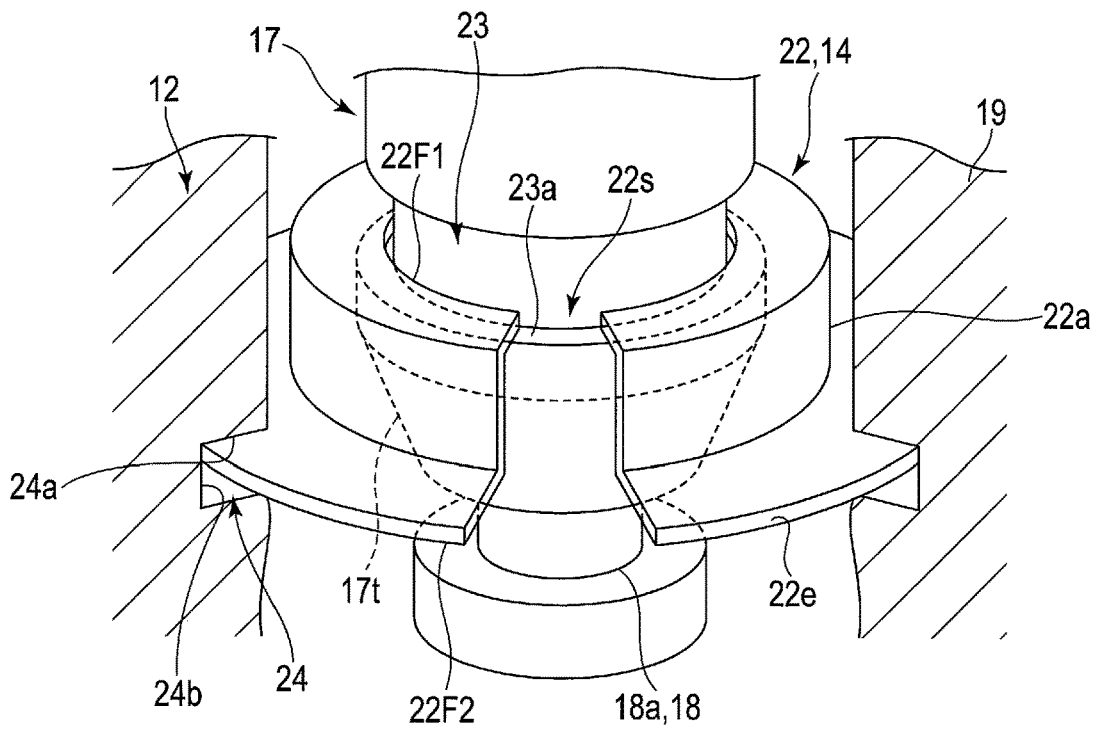
FIG. 4 is a perspective view showing the specified condition of the fastener.

Here, a method of assembling the ventilator 2, that is, a process of interposing the detachment/tilt prevention mechanism 14 (the fastener 22) between the blower fan 11 and the rotating mechanism 12 will be described with reference to FIG. 3 and FIG. 4.

First, the socket 17 of the blower fan 11 is made to advance toward one end (the first flange portion 22F1) of the fastener 22. Then, the socket main body 17a of the socket 17 comes near the inside of the first flange portion 22F1. At this time, the inclined surface 17t on the outer surface of the socket main body 17a functions as a guide surface when one end (the first flange portion 22F1) of the fastener 22 engages with the first engagement portion 23.

That is, the inclined surface 17t of the socket main body 17a enters along the first flange portion 22F1. Pressure force acts from the socket main body 17a (the inclined surface 17t) to the first flange portion 22F1. At this time, the fastener 22 is elastically deformed and expands such that the slit portion 22s becomes wider, while resisting its elastic force.

The socket 17 is made to further advance. The first flange portion 22F1 gets over the inclined surface 17t, and reaches the first engagement portion 23. At this time, the fastener 22 is elastically deformed such that the slit portion 22s becomes narrower, and is restored into an initial shape, by its elastic force (restoring force). On end (the first flange portion 22F1) of the fastener 22 partly engages with the first engagement portion 23. The first flange portion 22F1 is disposed to partly face the first engagement surface 23a. The fastener 22 is thereby set in the state in which one end (the first flange portion 22F1) thereof engages with the first engagement portion 23, that is, the state of being temporarily fastened to the blower fan 11 (the socket 17 and the socket main body 17a).

Here, pinching force is applied to the fastener 22, which is temporarily fastened to the blower fan 11. For example, pinching force is applied to the fastener main body 22a from both outer sides of the slit portion 22s. At this time, the fastener 22 is elastically deformed and reduced in diameter such that the slit portion 22s becomes narrower, while resisting its elastic force.

In a state in which the fastener 22 is reduced in diameter, the other end (the second flange portion 22F2) of the fastener 22 is moved along the inner surface of the rotational base 19, and is positioned in the second engagement portion 24. Here, the pinching force is removed. At this time, the fastener 22 is elastically deformed such that the slit portion 22s becomes wider, and restored into an initial shape, by its elastic force (restoring force). The other end (the second flange portion 22F2) of the fastener 22 partly engages with the second engagement portion 24. The second flange portion 22F2 is disposed to partly face the second engagement surface 24a and the third engagement surface 24b. The fastener 22 is thereby set in a state in which the other end (the second flange portion 22F2) thereof engages with the second engagement portion 24. In this manner, the detachment/tilt prevention mechanism 14 (that is, the fastener 22) is interposed between the blower fan 11 and the rotating mechanism 12.

At the same time, the distal end portion of the shaft 18b of the rotating mechanism 12 (the rotation axis portion 18) is fitted into the connecting portion 17b (the fitting recess 17g) of the blower fan 11 (the socket 17). The blower fan 11 and the rotating mechanism 12 are thereby connected to each other by the connecting mechanism 13. As a result, the rotor 20b of the socket 17 is disposed to face the stator 20a of the axis portion main body 18a. In this manner, the ventilator 2 shown in FIG. 1 to FIG. 4 is assembled.

According to the present embodiment, the fastener 22 is installed between the blower fan 11 and the rotating mechanism 12. One end (the first flange portion 22F1) of the fastener 22 engages with the first engagement portion 23 of the blower fan 11. The other end (the second flange portion 22F2) of the fastener 22 engages with the second engagement portion 24 of the rotating mechanism 12. In this case, when the blower fan 11 lifts up so as to detach, the first engagement portion 23 (the first engagement surface 23a) contacts one end (the first flange portion 22F1) of the fastener 22 accordingly. At this time, contact pressure acting on the one end (the first flange portion 22F1) of the fastener 22 is transmitted to and absorbed by the second engagement surface 24a and the third engagement surface 24b from the fastener main body 22a via the other end (the second flange portion 22F2) of the fastener 22. The blower fan 11 thereby can be prevented from detaching.

According to the present embodiment, the uplift amount (range) of the blower fan 11 is limited by the fastener 22 installed between the blower fan 11 and the rotating mechanism 12. The attitude and the position of the rotating blower fan 11 thereby can be kept fixed. As a result, the blower fan 11 can be prevented from contacting or being caught in the peripheral surfaces. In this manner, the blower fan 11 can be continuously rotated without being unable to rotate.

According to the present embodiment, the fastener 22 is formed of a resin material, for example, polyacetal. The fastener 22, which has a low coefficient of friction with metal and is excellent in elasticity, thereby can be realized. As a result, the blower fan 11 can be smoothly and lightly rotated.

According to the present embodiment, the fastener 22 comprising the slit portion 22s is applied, and the fastener 22 can be elastically deformed such that the slit portion 22s becomes wider and can be elastically deformed such that the slit portion 22s becomes narrower. The fastener 22 thereby can be smoothly and safely installed between the blower fan 11 and the rotating mechanism 12 without damaging the fastener 22.

According to the present embodiment, the fastener 22 is installed in a range in which the blower fan 11 (the socket 17) and the rotating mechanism 12 (the rotation axis portion 18) overlap each other around the rotation axis 21. The ventilator 2 thereby can be disposed without increasing a thickness from the blower fan 11 to the rotating mechanism 12 in a direction along the rotation axis 21. As a result, it is possible to meet a request that an electronic apparatus in which the ventilator 2 is mounted be thinner and smaller.

Modified Examples

In the above-described embodiment, one end (the first flange portion 22F1) of the fastener 22 is kept in the state of not contacting the first engagement portion 23 of the blower fan 11, while the other end (the second flange portion 22F2) of the fastener 22 is kept in the state of contacting the second engagement portion 24 of the rotating mechanism 12. Conversely, the one end (the first flange portion 22F1) of the fastener 22 may kept in the state of contacting the first engagement portion 23 of the blower fan 11, while the other end (the second flange portion 22F2) of the fastener 22 is kept in the state of not contacting the second engagement portion 24 of the rotating mechanism 12.

Alternatively, the one end (the first flange portion 22F1) of the fastener 22 may be kept in the state of not contacting the first engagement portion 23 of the blower fan 11, while the other end (the second flange portion 22F2) of the fastener 22 is kept in the state of not contacting the second engagement portion 24 of the rotating mechanism 12. Conversely, the one end (the first flange portion 22F1) of the fastener 22 may be kept in the state of contacting the first engagement portion 23 of the blower fan 11, while the other end (the second flange portion 22F2) of the fastener 22 is kept in the state of contacting the second engagement portion 24 of the rotating mechanism 12.

Figure 5:
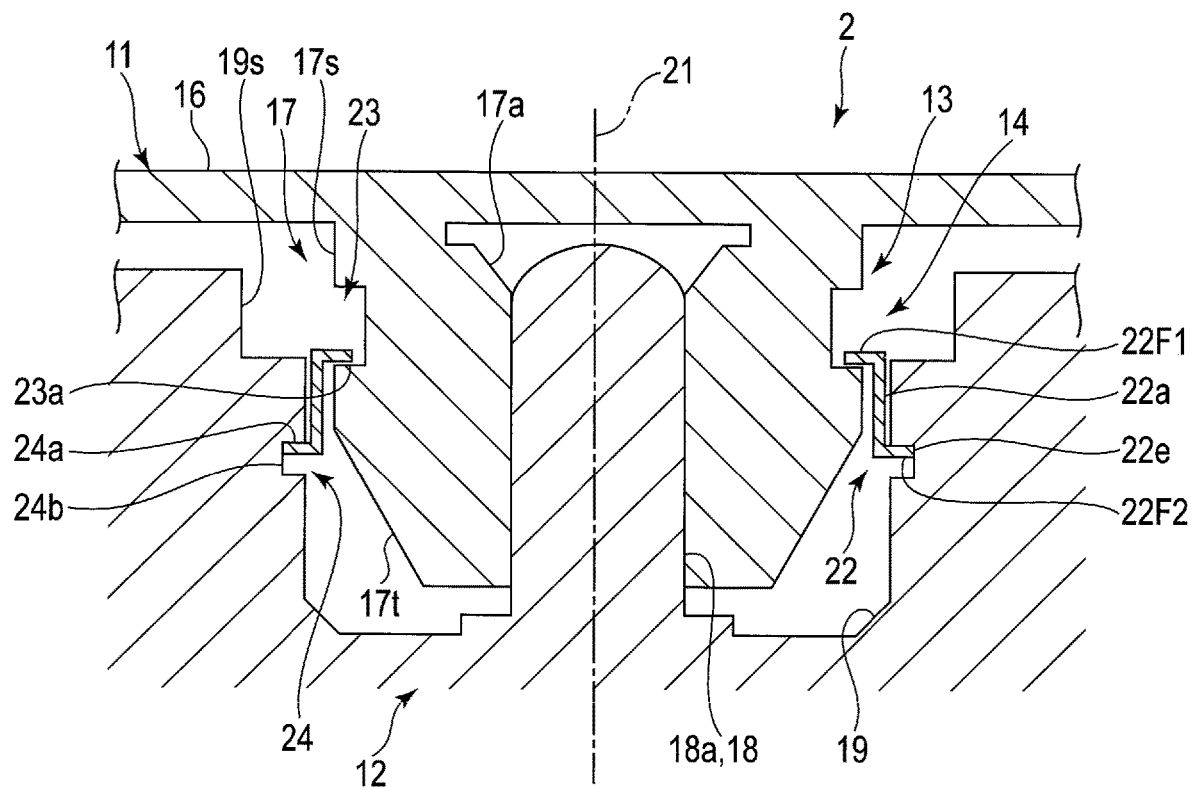
FIG. 5 is a sectional view around the fastener of the ventilator according to a modified example.

In the above-described embodiment, the motor comprising the stator 20a and the rotor 20b is applied as the actuator 20 of the rotating mechanism 12. Instead, the rotating mechanism 12 which rotates the rotational base 19 together with the rotation axis portion 18 may be applied as shown in FIG. 5. In this case, the socket 17 is constituted of only the socket main body 17a, and the rotating mechanism 12 is constituted of only the rotation axis portion 18 which can rotate together with the rotational base 19 (that is, the axis portion main body 18a).

Here, the socket main body 17a (the socket 17) is fitted on the axis portion main body 18a (the rotation axis portion 18) without gap. The blower fan 11 and the rotating mechanism 12 thereby can be connected. The other structures and advantageous effects are the same as those of the above-described embodiment, and thus an explanation thereof is omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electronic apparatus comprising:
a fastener installed between a blower fan and a rotating mechanism;
the fastener comprising:
a fastener main body having a cylindrical outline which is partly cut;
a first flange portion disposed at one end of the fastener main body;
a second flange portion disposed at the other end of the fastener main body; and
a slit portion continuously cut from the first flange portion to the second flange portion via the fastener main body,
an apparatus main body in which an internal space for accommodating various electrical components is formed; and a ventilator which is disposed inside the apparatus main body and which ventilates the internal space,
wherein the ventilator comprises:
the blower fan which produces forced convection of air along the internal space by rotating;
the rotating mechanism which rotates the blower fan by an actuator;
a connecting mechanism which connects the blower fan and the rotating mechanism to each other by a socket; and
a detachment/tilt prevention mechanism of the blower fan, and
the detachment/tilt prevention mechanism comprises:
the fastener;
a first engagement portion which is provided in the blower fan, is disposed to partly face the first flange portion, and with which the first flange portion of the fastener is able to partly engage; and
a second engagement portion which is provided in the rotating mechanism, is disposed to partly face the second flange portion, and with which the second flange portion of the fastener is able to partly engage.

2. The electronic apparatus of claim 1, wherein the blower fan comprises:

a plurality of rotary wings disposed at regular intervals along a direction of rotation of the blower fan; and
the socket configured to be connectable to the rotating mechanism,
the rotating mechanism comprises:
a rotation axis portion to which the socket is connected; and
a rotational base configured to surround the rotation axis portion,
the rotational base is disposed to face a periphery of the socket in a state in which the blower fan and the rotating mechanism are connected to each other by the connecting mechanism,
the first engagement portion is disposed on a facing surface of the socket, and the second engagement portion is disposed on a facing surface of the rotational base, and
the fastener is interposed between the facing surfaces.

3. The electronic apparatus of claim 2, wherein an inclined surface having a preset inclination is formed on an outer surface of the socket, and
the inclined surface functions as a guide surface when the first flange portion of the fastener engages with the first engagement portion.

* * * * *